Dec. 9, 1969
C. MICHELSON
3,482,907
FILM HAVING SEVERAL IMAGE SEQUENCES
Filed April 4, 1967
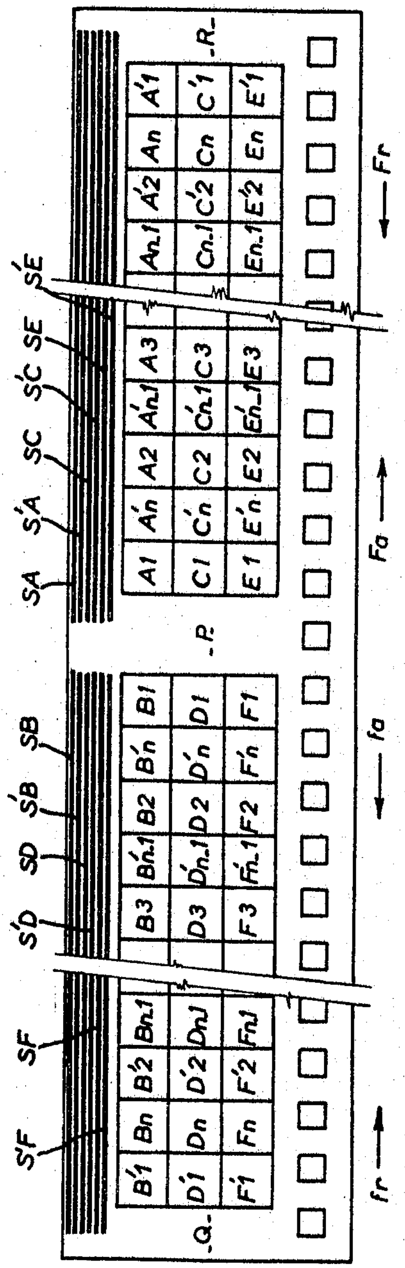
Inventor
Charles Michelson
By Watson, Cole, Grindle & Watson
Attorneys United States Patent Office 3,482,907
Patented Dec. 9, 1969

3,482,907

FILM HAVING SEVERAL IMAGE SEQUENCES

Charles Michelson, Paris, France, assignor to Teverama S.A., Lausanne, Vaud, Switzerland, a Swiss company Filed Apr. 4, 1967, Ser. No. 628,353
Claims priority, application France, May 4, 1966, 60,263
Int. Cl. G03b 31/02
U.S. Cl. 352—37 1 Claim

ABSTRACT OF THE DISCLOSURE

A film with several sequences of intercalated images along parallel rows, each sequence starting and ending at a same central section positioned at about half-length of the film and being projected by driving the film in one direction from this central section toward one end and then back in the opposite direction from said end toward said central section.

Cinematographic films are known which are of the type comprising one or more rows of intercalated images belonging to different sequences, the images which are intended to be projected successively being separated by a space containing at least one image of a different sequence, the sound tracks, if any, being in a number equal to that of the image sequences of the film. The films of this type can be given a forward and rearward winding movement, each winding travel in one direction or the other corresponding to one sequence of images.

Thus, in order to project one image sequence, the winding is started at one end of the film and the latter is driven in the forward direction, missing each alternate image (in the simplest case of two image sequences intercalated in each row), the images which have been missed during this projection and corresponding to another sequence being then projected in their turn, starting from the other end of the film and with the latter being driven in the reverse direction. The procedure is the same for each of the rows of images.

In order to make matters clear, if a film is considered which has three rows of intercalated images, each of two sequences, there will be altogether six sequences (three for the forward winding and three for the reverse winding), of which three only are accessible at a given instant, according to which end of the film is concerned. Consequently, in the case where it is desired to project a sequence which commences at the end of the film opposite to that which is in the projection apparatus, it is necessary for this film to be completely unwound beforehand for the sole purpose of changing ends.

The present invention has for its object to avoid this inconvenience and to permit the starting of any selected sequence at the point in which the film is situated on completing the projection of any preceding sequence.

In accordance with the present invention, each sequence starts and ends in a region situated at mid-length of the film and these images are staggered from this point as far as one end of the film and then from this end as far as one end of the film and then from this end as far as the said point, so that the proejction of one sequence is effected by driving the film in one direction from the middle to the end and in the other direction from this end to the starting point, the different sequences being distributed on the two halves of the film on either side of its middle.

It is obvious that in the case of a film having sound tracks, these latter will be appropriately arranged and will be provided, for each forward and reverse image sequence, in the form of two likewise forward and reverse longitudinal sections.

The single figure of the accompanying drawing shows diagrammatically a film developed in accordance with one embodiment of the invention.

In the example illustrated, the film comprises six image sequences A, B, C, D, E, F in three parallel rows or rather in six half-rows: three half-rows to the left and three half-rows to the right of a part P of the film situated at mid-length of this latter. Each sequence, such as A, is composed of a first succession of images A1, A2, A3 . . . A*n*–1, An, extending from the central part P as far as one end Q or R, depending on circumstances, and then a second succession of images A'1, A'2, A'3 . . . A'*n*–1, A'*n*, intercalated with the preceding images and extending from the same end Q or R as far as the said starting central part P. Consequently, for the projection of the sequence in question, starting from the middle of the film, the latter will be caused to wind in one direction (forward: arrow F*a* or *fa*) and then in the opposite direction (reverse: arrow F*r* or *fr*), in order eventually to be back at the starting point, ready for the projection of another sequence. It will in fact be noted that the first images A1, B1, C1, D1, E1, F1 of the six sequences and their last images A'*n*, B'*n*, C'*n*, D'*n*, E'*n*, F'*n* are grouped in the central region P of the film, which serves as the starting and finishing point.

At the time of reversing the running direction, it is expedient to effect in known manner a relative shifting of the film and of the optical system by the height of one image. This can be effected automatically by providing phase-shift "initiators," both in my end parts Q and R and in the central part P. Such initiators have formed the subject of the co-pending U.S. patent application No. 584,160 of Oct. 4, 1966.

Corresponding to the different image sequences are sound tracks SA, SB, SC, SD, SE, SF for the forward movement and S'A, S'B, S'C, S'D, S'E, S'F for the return movement. Consequently, on each side of the central region P, there are six juxtaposed half sound tracks corresponding respectively to the six half-sequences of images on the same side.

Such a film is particularly adapted for being used in automatic coin-operated machines of the jukebox type at present used in public places for musical recordings. Since it is not the desire, in this sphere, to have long projection periods, but on the contrary projection periods of short duration, for example, of the order of three minutes, it will be of interest to employ films which are of short length and great width so as to be able to arrange thereon the largest possible number of image sequences and thus of programmes. A standard 35 mm. film would permit of up to 18 or even more different programmes being offered, and this number could be almost doubled with a 70 mm. film.

The film forming the subject of the present invention can likewise be given an interesting application for cinematographic projection, in which case it will advantageously be presented in a cartridge or box of the type adapted to be directly engaged in a projector, practically without any manipulation of the film itself, which is wound on two spools and in a satisfactory middle starting position. The choice of the row of images will be effected simply by adjusting by displacement the level of the box in front of the projection aperture; the starting of the film to the right or to the left will also be determined by the adjustment member, permitting the said choice of the row of images.

I claim:

1. A cinematographic film of the reciprocable, multi-sequence, intercalated image kind designed for use in jukebox type machines, comprising an intermediate section of rest and sequence selection, and a plurality of longitudinal rows of images extending on both sides of said intermediate section between the same and respective motion reversal sections remote therefrom, each of said rows bearing a same sequence of intercalated images subdivided into two halves, namely a head half originating at said intermediate section and extending to a corresponding reversal section, and a tail half extending from said corresponding reversal section and terminating at said intermediate section, whereby all said image sequences both originate and terminate at said intermediate section.

References Cited

UNITED STATES PATENTS

| | | | |
|---|---|---|---|
| 2,483,040 | 9/1949 | El-Mazzaoui | 352—239 |
| 2,590,956 | 4/1952 | Gille | 352—239 |
| 3,341,276 | 9/1967 | Prater | 352—83 XR |
| 3,391,977 | 7/1968 | Wolff | 352—241 XR |

NORTON ANSHER, Primary Examiner

D. S. STALLARD, Assistant Examiner

U.S. Cl. X.R.

352—239